United States Patent
Walsh

(10) Patent No.: US 11,322,797 B2
(45) Date of Patent: May 3, 2022

(54) MEMBRANE ELECTRODE ASSEMBLIES FOR ION CONCENTRATION GRADIENT DEVICES

(71) Applicant: Kevin Michael Walsh, Atlanta, GA (US)

(72) Inventor: Kevin Michael Walsh, Atlanta, GA (US)

(*) Notice: Subject to any disclaimer, the term of this patent is extended or adjusted under 35 U.S.C. 154(b) by 0 days.

(21) Appl. No.: 17/179,872

(22) Filed: Feb. 19, 2021

(65) Prior Publication Data
US 2021/0175578 A1    Jun. 10, 2021

Related U.S. Application Data

(63) Continuation of application No. PCT/US2019/048059, filed on Aug. 26, 2019.
(Continued)

(51) Int. Cl.
| | |
|---|---|
| H01M 50/411 | (2021.01) |
| H01M 50/497 | (2021.01) |
| H01M 50/46 | (2021.01) |
| B01J 47/10 | (2017.01) |
| H01M 8/1004 | (2016.01) |

(Continued)

(52) U.S. Cl.
CPC .......... *H01M 50/411* (2021.01); *B01J 47/10* (2013.01); *H01M 8/1004* (2013.01); *H01M 50/46* (2021.01); *H01M 50/497* (2021.01); *H01M 8/0221* (2013.01); *H01M 8/18* (2013.01)

(58) Field of Classification Search
None
See application file for complete search history.

(56) References Cited

U.S. PATENT DOCUMENTS

| 9,540,261 B2 | 1/2017 | Lin |
| 9,643,175 B2 | 5/2017 | Haas et al. |

(Continued)

FOREIGN PATENT DOCUMENTS

EP   3090988 A2   11/2016

OTHER PUBLICATIONS

PCT, International Preliminary Report on Patentability for corresponding PCT Patent Application No. PCT/US19/48059, dated Mar. 9, 2021, 5 pages.

(Continued)

*Primary Examiner* — Daniel S Gatewood
(74) *Attorney, Agent, or Firm* — NK Patent Law

(57) ABSTRACT

A device for enabling controlled movement of ions between a first ion-containing fluid and second ion-containing fluid comprises at least one cationic exchange membrane positioned between the first and second ion-containing fluids, and at least one anionic exchange membrane in parallel with the at least one cationic exchange membrane positioned between the first and second ion-containing fluids. The one or more of the at least one cationic exchange membrane and the at least one anionic exchange membrane is a membrane electrode assembly comprising an ion exchange membrane, and one or more permeable electrodes embedded within the ionic exchange membrane. The number of cationic exchange membranes and the number of anionic exchange membranes is the same, and the ions move through the membrane electrode assembly in response to a variable capacitive charge.

18 Claims, 20 Drawing Sheets

Related U.S. Application Data

(60) Provisional application No. 62/804,627, filed on Feb. 12, 2019, provisional application No. 62/777,188, filed on Dec. 9, 2018, provisional application No. 62/735,153, filed on Sep. 23, 2018, provisional application No. 62/729,922, filed on Sep. 11, 2018.

(51) Int. Cl.
*H01M 8/0221* (2016.01)
*H01M 8/18* (2006.01)

(56) References Cited

U.S. PATENT DOCUMENTS

| | | |
|---|---|---|
| 2011/0195323 A1 | 8/2011 | Inoue et al. |
| 2014/0166488 A1 | 6/2014 | Lin et al. |
| 2016/0326025 A1* | 11/2016 | Choi ................ B01D 61/48 |

OTHER PUBLICATIONS

ISA/US, International Search Report and Written Opinion for corresponding PCT Patent Application No. PCT/US19/48059, dated Nov. 12, 2019, 6 pages.

\* cited by examiner

MEMBRANE ELECTRODE ASSEMBLIES FOR ION CONCENTRATION GRADIENT DEVICES

CROSS-REFERENCE TO RELATED APPLICATION

This application is a continuation of International Patent Application No. PCT/US2019/048059 titled "MEMBRANE ELECTRODE ASSEMBLIES FOR ION CONCENTRATION GRADIENT DEVICES", filed Aug. 26, 2019, which claims the benefit of priority of U.S. Provisional Patent Application No. 62/729,922 titled "Membrane Electrode Assemblies for Ion Concentration Gradient Devices," filed on Sep. 11, 2018; U.S. Provisional Patent Application No. 62/735,153 titled "Membrane Electrode Assemblies for Ion Concentration Gradient Devices," filed on Sep. 23, 2018; U.S. Provisional Patent Application No. 62/777,188 titled "Membrane Electrode Assemblies for Ion Concentration Gradient Devices," filed on Dec. 9, 2018; and U.S. Provisional Patent Application No. 62/804,627 titled "Membrane Electrode Assemblies for Ion Concentration Gradient Devices," filed on Feb. 12, 2019, which are all incorporated herein in their entireties by this reference.

BACKGROUND OF THE DISCLOSURE

The subject disclosure relates generally to ion gradient devices that consume or generate electricity directly, both for the separation of ions with an input of electrical energy and for the mixing of ions with an output of electrical energy.

Ion gradient devices are designed to accomplish two objectives. One is deionization, in which ions are transported from a low concentration to a higher concentration with an input of electricity to drive the process. The other is gradient mixing, in which two solutions with differing ion concentrations are allowed to mix with a concurrent generation of electrical energy. There are two electrically-based technologies that have been previously developed for these purposes—capacitive ionization and electrodialysis. These technologies are described in further detail herein. Numerous variants of the technologies using essentially the same methods are known in the prior art.

An advantage of capacitive ionization is that it utilizes efficient capacitive charging. Nearly 100% of the energy used to charge a capacitor can be recovered on discharge. To achieve this efficiency, however, the capacitor must have a low electrical resistance, both electronic and ionic. Low electronic resistance may be easily obtained, but the ionic resistance of capacitive ionization electrodes is relatively high. This is due to the need to use porous, very high surface area electrodes. In these electrodes, ions must traverse a large number of microscopic pores to reach the entire electrode surface. This mobility issue is particularly acute when the ionic strength of the liquid is low (the dilute phase).

When an electrode is fully charged/absorbed with ions, it must be regenerated by discharging the ions into a different liquid (flow switching). This flow switching introduces additional losses (including fluid mixing and long equilibration times with concurrent internal discharging). High surface area electrodes effectively reduce the rate at which flow switching must occur, but they come with the drawback of increased ionic resistance. Despite this, all capacitive ionization devices use high surface area electrodes to reduce the rate of fluid switching.

An advantage of electrodialysis is that unlike capacitive ionization, it is a continuous flow through process. In addition, the electrodes do not need to have high surface areas since electrodialysis uses redox electrochemical reactions to produce an ionic current. Electrodialysis reactions, however, are energy inefficient due to electrical resistance at the electrode-fluid interface. This is caused by ohmic resistance and by reaction overpotentials (the additiona, non-recoverable potential needed to drive an electrochemical reaction). In addition, these electrodes are expensive (resulting from the need to use precious metal catalysts) and the electrode compartment fluids must be constantly replenished as the redox active chemicals leak out through the membranes.

Although both capacitive ionization and electrodialysis devices are known in the prior art, there remains a need for an electric gradient device that combines the advantages of both capacitive ionization and electrodialysis without the drawbacks associated with either process.

SUMMARY OF THE INVENTION

The present invention provides a capacitive device that uses a continuous flow-through process, while also employing low surface area, low resistance electrodes for cyclic charging for greatly improved efficiencies.

In one embodiment of the present invention, a device for enabling controlled movement of ions between a first ion-containing fluid and a second ion-containing fluid may include at least one cationic exchange membrane positioned between the first and second ion-containing fluids. The device may further include at least one anionic exchange membrane in parallel with the at least one cationic exchange membrane, and positioned between the first and second ion-containing fluids. The one or more of the at least one cationic exchange membrane and the at least one anionic exchange membrane is a membrane electrode assembly. The membrane electrode assembly may include an ion exchange membrane and one or more permeable electrodes embedded within the ionic exchange membrane. The device may further include a charger connected to the at least one or more permeable electrodes, wherein the charger supplies the one or more permeable electrodes with a variable capacitive charge. The number of cationic exchange membranes and the number of anionic exchange membranes may be the same and the ions may move through the membrane electrode assembly in response to the variable capacitive charge.

In another embodiment of the present invention, a device for enabling controlled movement of ions between a first ion-containing fluid and a second ion-containing fluid may include one or more membrane pairs arranged in series. Each membrane pair may include a cationic exchange membrane positioned between the first and second ion-containing fluids and an anionic exchange membrane adjacent the cationic exchange membrane, and positioned between the first and second ion-containing fluids. One of the cationic exchange membranes and anionic exchange membranes may be a membrane electrode assembly. The membrane electrode assembly may include an ion exchange membrane and one or more permeable electrodes embedded within the ionic exchange membrane. The device may further include a charger connected to the at least one or more permeable electrodes, wherein the charger supplies the one or more permeable electrodes with a variable capacitive charge. The ions may move through the membrane electrode assembly in response to the variable capacitive charge.

In yet another embodiment of the present invention, the device may further include a grounded switch connected to the charger and the one or more permeable electrodes.

In yet another embodiment of the present invention, an ion concentration of the first ion-containing fluid may be greater than an ion concentration of the second ion-containing fluid.

In yet another embodiment of the present invention, the ion exchange membrane of the membrane electrode assembly may be a cationic exchange membrane.

In yet another embodiment of the present invention, the ion exchange membrane of the membrane electrode assembly may be an anionic exchange membrane.

In yet another embodiment of the present invention, the one or more permeable electrodes may be coated with a high density prepolymer.

In yet another embodiment of the present invention, the device may further include a pair of external permeable electrodes in the second ion-containing fluid.

In yet another embodiment of the present invention, the device may further include an external permeable electrodes in the first ion-containing fluid.

BRIEF DESCRIPTION OF THE DRAWINGS

FIG. 20 shows a diagram of a gradient membrane electrode cell according to certain embodiments of the present invention.

DETAILED DESCRIPTION

The presently disclosed subject matter is presented with sufficient details to provide an understanding of one or more particular embodiments of broader inventive subject matters. The descriptions expound upon and exemplify particular features of those particular embodiments without limiting the inventive subject matters to the explicitly described embodiments and features. Considerations in view of these descriptions will likely give rise to additional and similar embodiments and features without departing from the scope of the presently disclosed subject matter.

Unless defined otherwise, all technical and scientific terms used herein have the same meaning as commonly understood to one of ordinary skill in the art to which the presently disclosed subject matter pertains. Although any methods, devices, and materials similar or equivalent to those described herein can be used in the practice or testing of the presently disclosed subject matter, representative methods, devices, and materials are now described.

Following long-standing patent law convention, the terms "a", "an", and "the" refer to "one or more" when used in the subject specification, including the claims. Thus, for example reference to "an additive" can include a plurality of such additives, and so forth.

Unless otherwise indicated, all numbers expressing quantities of components, conditions, and so forth used in the specification and claims are to be understood as being modified in all instances by the term "about". Accordingly, unless indicated to the contrary, the numerical parameters set forth in the instant specification and attached claims are approximations that can vary depending upon the desired properties sought to be obtained by the presently disclosed subject matter.

As used herein, the term "about", when referring to a value or to an amount of mass, weight, time, volume, concentration, and/or percentage can encompass variations of, in some embodiments +/−20%, in some embodiments, +/−10%, in some embodiments +/−5%, in some embodiments +/−1%, in some embodiments +/−0.5%, and in some embodiments, +/−0.1%, from the specified amount, as such variations are appropriate in the disclosed products and methods.

Figure 1:
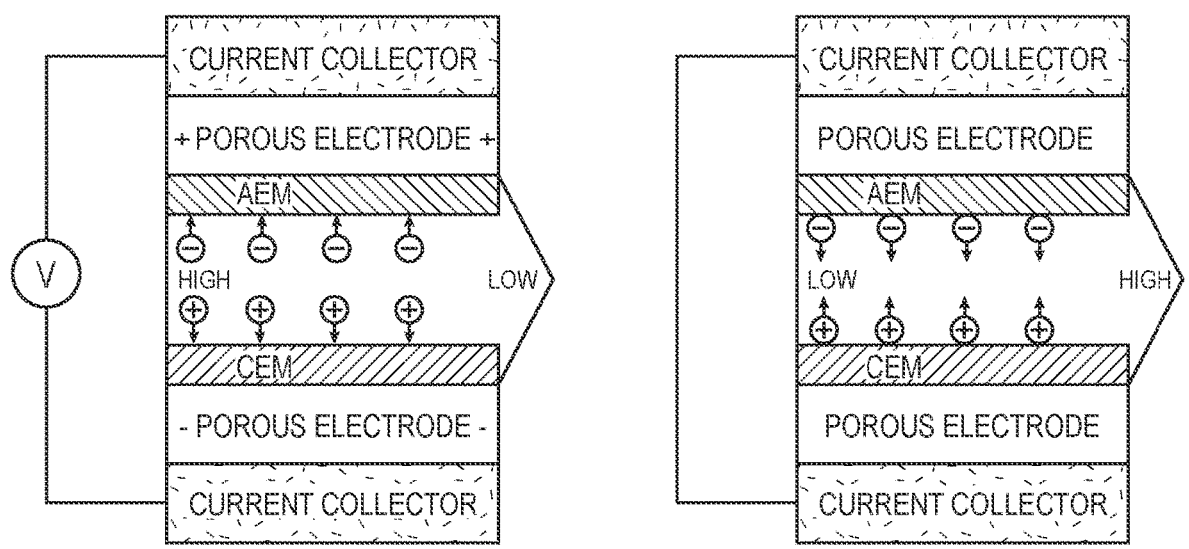
FIG. 1 shows a diagram of a prior art capacitive ionization deionization device.

Referring now to FIG. 1, a prior art capacitive ionization deionization device is shown. The deionization device consists of high surface area electrodes on either side of a central fluid. In between the fluid and electrodes are ion selective, semi permeable membranes (IEX Membranes). The membranes are cation exchange membranes (CEM) and anion exchange membranes (AEM), meaning either positive or negative ions are mobile and can move through them. A cyclical process occurs in which the electrode pair is alternately charged and discharged. The electrodes are charged in the solution to be deionized, followed by a discharge in a reject/waste solution. The charging step absorbs ions from the dilute solution onto the electrode surfaces and the discharge releases the ions into the waste solution.

Figure 2:
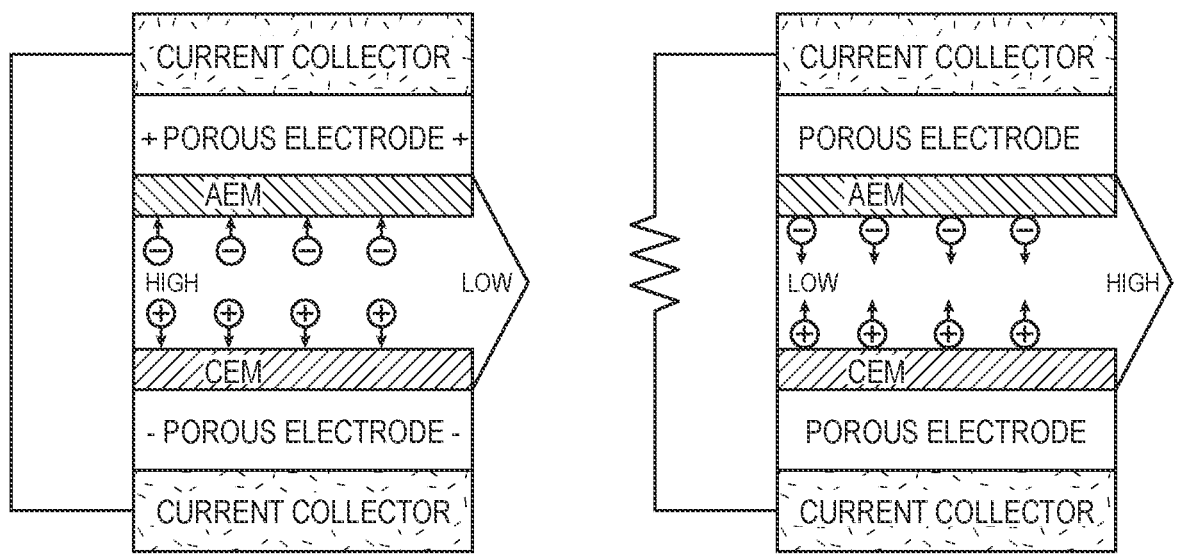
FIG. 2 shows a diagram of a prior art capacitive ionization energy generation device.

Referring now to FIG. 2, prior art capacitive ionization devices may also generate energy from a concentration gradient. The electrodes are "charged" by ion diffusion from a higher concentration solution (e.g. seawater), followed by a discharge in a more dilute solution (e.g. river water). The decreased ionic strength of the dilute solution results in an increase in the electrode voltage, while the total stored charge remains the same. This voltage increase means that more energy is released during electrode discharge than is consumed in the charging step, resulting in a net energy output. Both deionization and energy generation require alternating the dilute and concentrate fluids between the electrodes.

Figure 3:
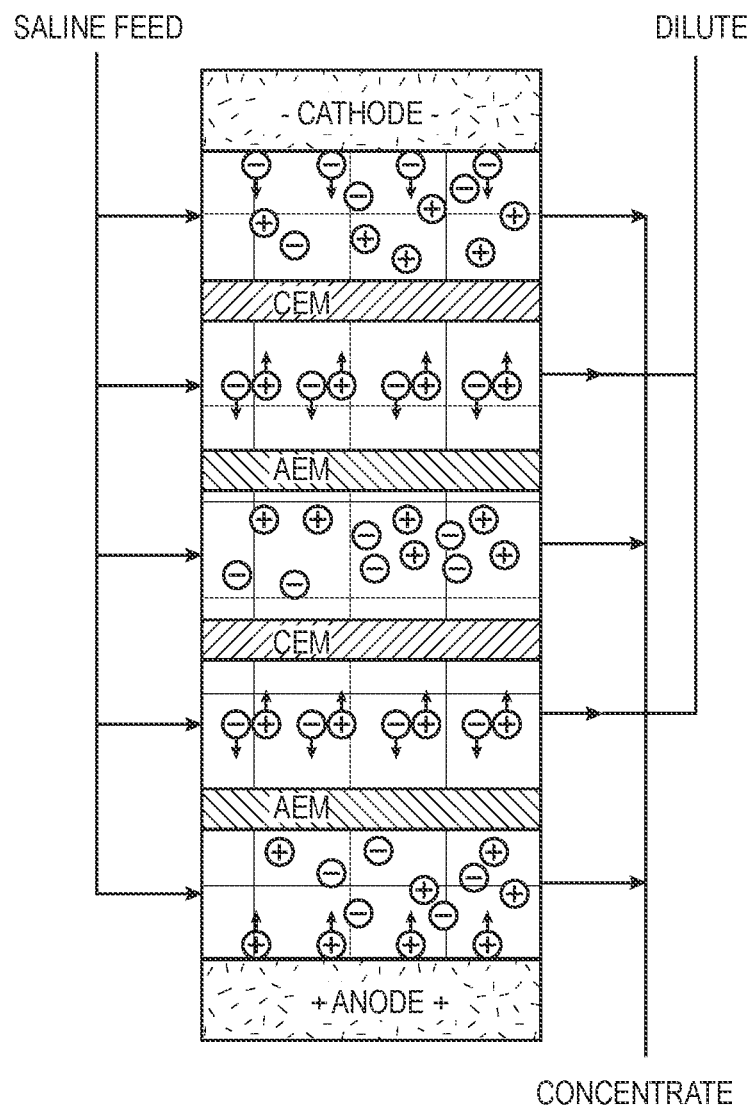
FIG. 3 shows a diagram of a prior art electrodialysis process.

Referring now to FIG. 3, a prior art electrodialysis device is shown. A cell stack is created by alternating cation and anion selective membranes between high and low concentration flows. Deionization occurs where salts are able to drift across a membrane in the direction of an applied electric field. Concentration occurs in the adjacent flow paths, since further movement in the direction of the electric field is blocked by the membranes. The ionic circuit is completed at the ends of the stacks via a simultaneous oxidation and reduction reactions at a pair of electrodes. For an aqueous system, this reaction is typically the reduction of water at the cathode to produce hydroxide and oxidation at anode to give hydronium.

Figure 4:
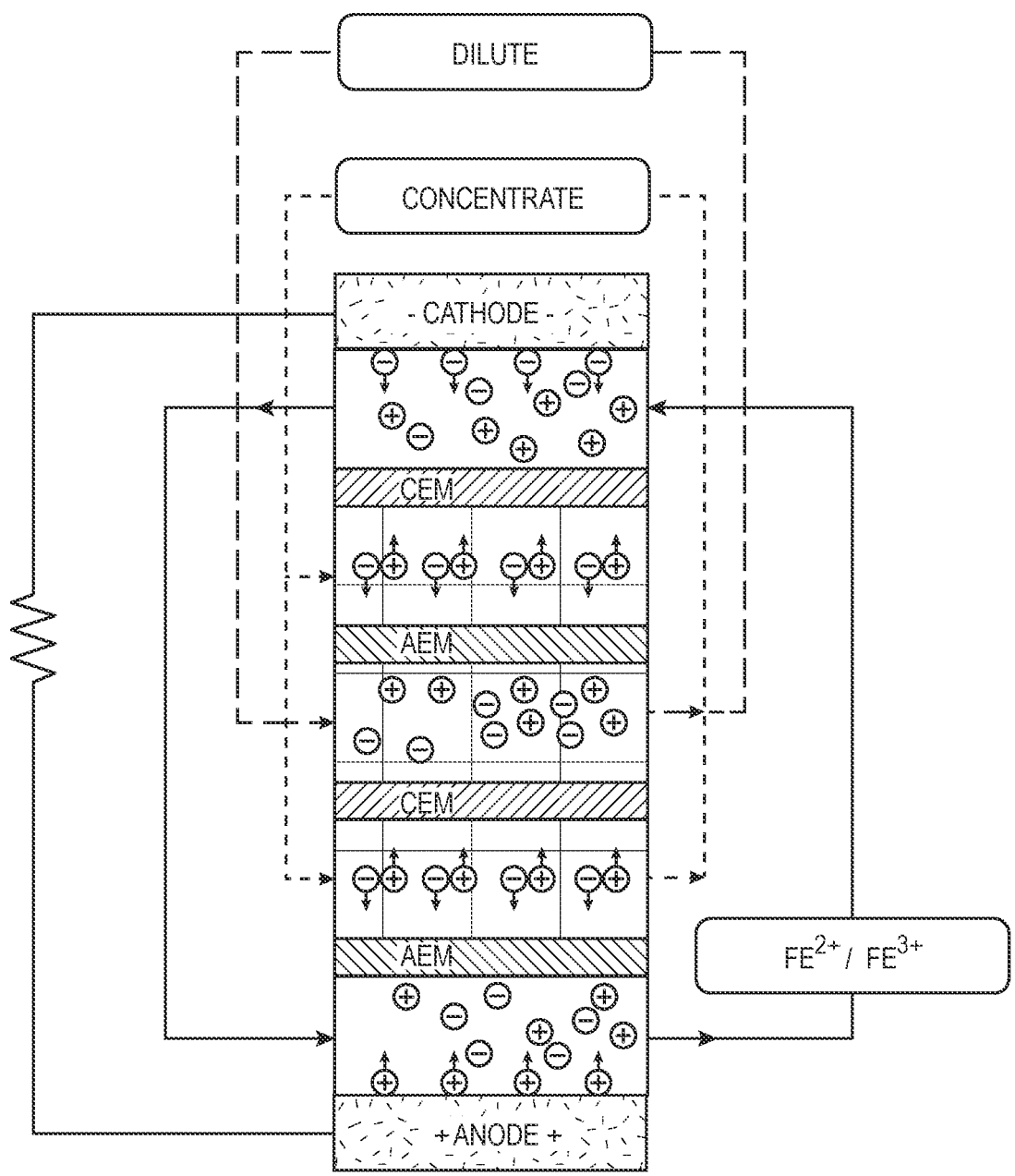
FIG. 4 shows a diagram of a prior art reverse electrodialysis process.

Referring now to FIG. 4, a prior art reverse electrodialysis device is shown. Energy generation by reverse electrodialysis operates in a similar manner to electrodialysis. Ions spontaneously flow from high to low concentration across the alternating membranes. The membranes force the positive and negative ions to move in one direction only, with respect to charge. The end electrodes in this case complete the ion circuit via a reversible oxidation-reduction reaction (typically an $Fe^{2+}/Fe^{3+}$ couple). The redox active fluid is circulated between the end electrodes.

Figure 5:
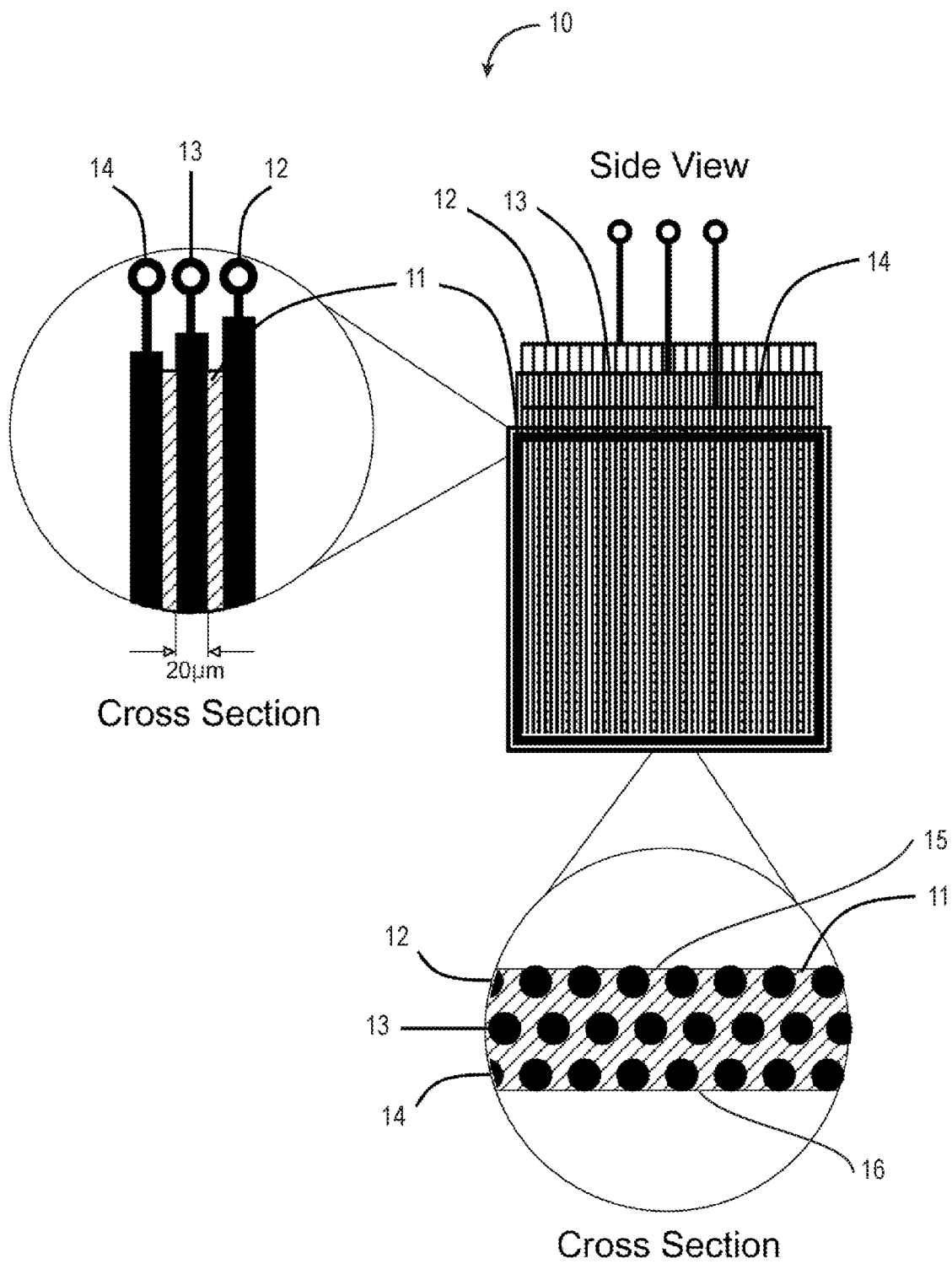
FIG. 5 shows a diagram of a membrane electrode assembly according to certain embodiments of the present invention.

Referring now to FIG. 5, a membrane electrode assembly 10 according to some embodiments of the present invention is shown. The membrane electrode assembly 10 may be designed to controllably move ions through a concentration gradient. Membrane electrode assembly 10 may consist of an ion exchange membrane 11 with three embedded, parallel plane electrodes 12, 13, 14. Electrodes 12, 14 may be located at each surface 15, 16 and the third electrode 3 may be in the middle of the ion exchange membrane 11. The three electrodes 12, 13, 14 may be through-plane permeable. Specifically, the electrodes may have openings such as pores, or they may be fabricated as a wire grid. The pores and/or spaces within and between the electrodes 12, 13, 14 may be filled with the ion exchange membrane material. This embedded material may form an ionically conductive path that allows either positive or negative co-ions to move freely through the membrane electrode assembly 10.

The fabrication of ion exchange membranes 11 are well known. Generally, they may comprise films comprised primarily of charged polymers. The polymers often may be crosslinked to improve strength and charge selectivity. The charge on the polymer may be fixed to the polymer matrix. These fixed charged may inhibit movement of ions of the same charge, while allowing co-ions to move freely through the membrane 11. For example, a polymer with pendant quaternary ammonium ions (positively charged) may typically be used in anionic exchange membranes and polymers with pendant sulfonate groups (negatively charged) in cationic exchange membranes. The membranes 11 may be both homogenous and heterogeneous. Heterogeneous membranes sometimes may be made from mixtures of organic and inorganic materials.

The electrodes 12, 13, 14 may be analogous to those found in electrolytic capacitors, with the membrane material serving as a "capacitor electrolyte." The electrodes 12, 13, 14 are not in direct contact, but may be coupled electrostatically and by ionic conduction (via mobile co-ions). They may be fabricated from any conductor, such as carbon/graphite, conductive polymers and metals, or from a metal that forms an impermeable, insulating oxidized surface (e.g., aluminum). Where the voltage applied to the electrodes 12, 13, 14 exceeds the electrochemical window of the fluid in which the membrane electrode assembly is immersed, the electrodes 12, 13, 14 may be coated with an insulator. The insulator may be a polymer, but preferably a very thin oxidized metal layer. Preferably, the electrodes 12, 13, 14 may have a high surface roughness, to increase capacitance. Some superficial porosity in the electrodes 12, 13, 14 may also be preferred, but only to a depth at which ion mobility and exchange kinetics may not be significantly impaired.

The function of the ion exchange material in the membrane electrode assembly 10 may be conventional (acts as an electronic insulator and confines ionic conduction solely to either cations or anions). Preferably, the membrane 11 may be made as thin as practical to minimize internal resistance, while maintaining ion selectivity. The function of the electrodes 12, 13, 14 may be to regulate the movement of mobile ions. Preferably, the electrodes 12, 13, 14 may be as open or porous as possible to minimize ionic resistance, while still being capable of regulating ion movement. The maximum open space within the electrodes 12, 13, 14 may be limited by their need to establish an electric field sufficiently uniform to allow control of the movement of co-ions through the membrane electrode assembly 10. These aspects of the membrane electrode assembly 10 are discussed further below.

Figure 6:
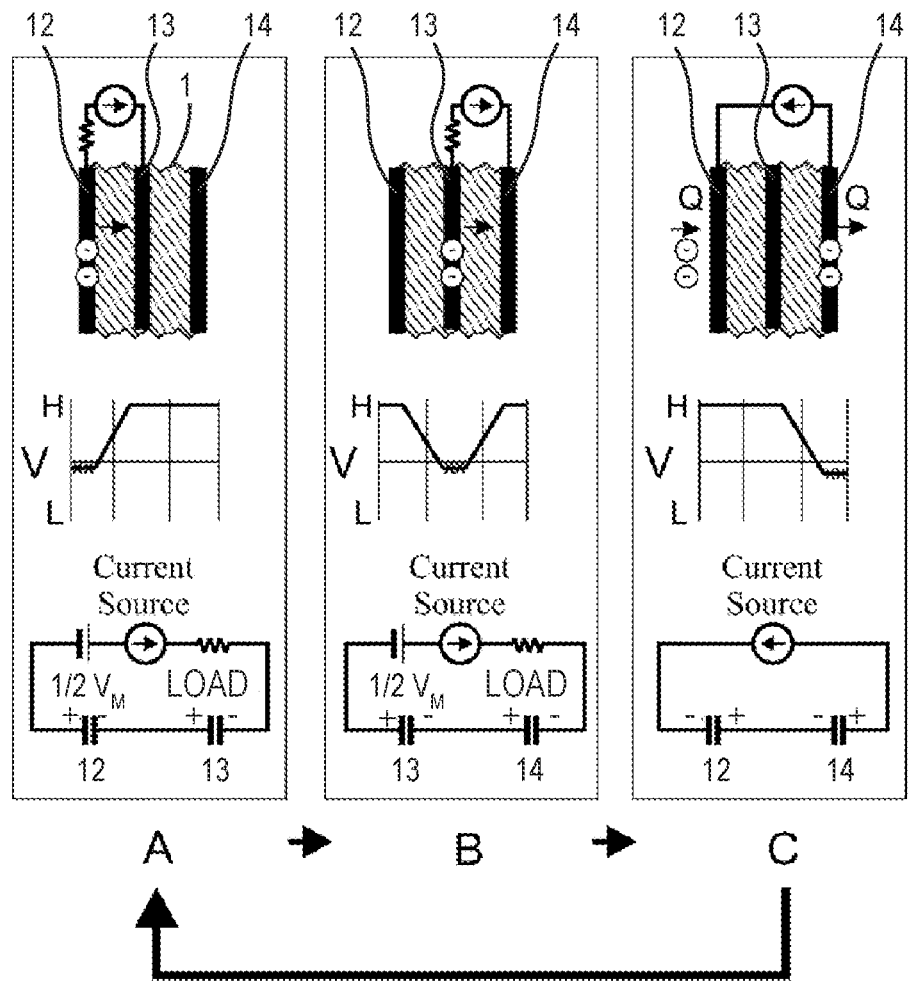
FIG. 6 shows a circuit schematic of an anionic membrane electrode assembly according to certain embodiments of the present invention.

Referring now to FIG. 6, a schematic view of the movement of mobile ions through am anion conductive membrane electrode assembly 10 is shown. FIG. 6 shows the location and movement of mobile ions in a cross-section, the relative electrode potentials, and the equivalent circuit. Ion movement is from left to right. Movement of ions through the membrane electrode assembly 10 occurs in a three step cycle. Due to the charge selectivity of the membranes 1, an equilibrium potential (the Donnan potential) will occur across the membrane electrode assembly 10, designated as $V_M$. A quantity of mobile charge, Q, crossing the membrane electrode assembly 10 in the direction of the oppositely charged surface will release an amount of energy equal to $QV_M$. Likewise, movement of Q in the opposite direction (deionization) requires as a minimum, an energy input of $QV_M$.

In step A of FIG. 6, the mobile ions are advanced into the middle of the membrane electrode assembly 10 by connecting electrode 12 to electrode 13 via an external power source. The power source may be a constant current source, but any means of applying a voltage may be used. Membrane 1 switches from low to high potential and electrode 12 from high to low potential. The circuit potential $V_{cell}$ for each step in the cycle is $$V_{cell} = V_c \pm V_X \pm IR_{int},$$

where $V_c$ is the capacitive voltage, $V_X$ is the change in potential resulting from ion movement through the membrane electrode assembly electric field, $R_{int}$ is the internal circuit resistance and I is the constant current. The capacitive voltage is given by $$V_c = \sum V_c^0 + \frac{I}{C}t,$$

where $\Sigma V_c^0$ is the sum of initial voltage on each electrode 12, 13, 14, C the equivalent circuit capacitance and t the time. The anions in Step A move half the distance to the opposite side and $V_X$ is equal then to ½ $V_M$.

In step B of FIG. 6, the ions complete their movement through the membrane electrode assembly 10 by connecting electrode 13 to electrode 14 through a constant current source. Electrode 13 switches from low to high potential and electrode 14 from high to low potential and $V_X$ is again approximately ½ $V_M$.

In step C of FIG. 6, anions simultaneously enter the membrane electrode assembly 10 onto electrode 12 and exit from electrode 14, recombining with cations. Electrode 12 switches from a high (negative) to low (positive) potential and electrode 14 from a low to high potential. The ions do not move across the membrane electrode assembly 10 in this step, and thus $V_X$ is approximately zero.

The relative timing of electrode charging, the depth of charge, relative potentials on each, etc. may be adjusted as needs demand to optimize system efficiency.

In step A, a quantity of charge, Q, moves simultaneously into and out of the membrane electrode assembly 10. A counter electrode (not pictured) may be employed to store −Q as counter-ion charge. The counter electrode may be simply the container within which the membranes and fluid are held. This charge may be applied at startup by connecting the counter electrode with any of the three electrodes 12, 13, 14. Since the internal membrane electrode assembly charge does not need to vary over time, the charge on the counter electrode may also remain constant.

The capacitance of the electrodes 12, 13, 14 is polarity dependent, having a high capacitance at low potential and low capacitance when at high potential. When an electrode is at a low potential (negative charge in cation exchange membranes and positive in anion exchange membranes), the ions move close to the surface of the electrode. This results in a high capacitance, since the electric field is primarily confined to a very narrow region in between. At high potential, mobile ions are pulled towards the opposite electrode and the counter charge is located in the fixed charge bound to the membrane structure. The electric field is spread over a greater distance, resulting in a lower capacitance. A close analogy is found in metal-oxide-semiconductor (MOS) capacitors, where a low potential corresponds to "charge carrier accumulation" and high potential to "carrier depletion."

Figure 7:
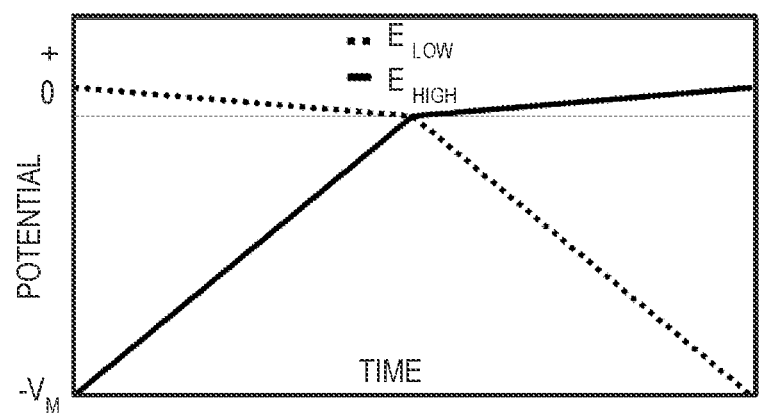
FIG. 7 shows a graph of electrode potentials according to certain embodiments of the present invention.

FIG. 7 shows electrode potential variation during a single step. For an anion membrane electrode assembly, the $E_{low}$ electrode initially has a positive potential and $E_{high}$ is negative. A capacitance ratio of 10:1 is assumed. The high potential is equal to $V_M$. These electrode potential profiles are identical for all three steps of the movement of ions shown in FIG. 6.

Figure 8:
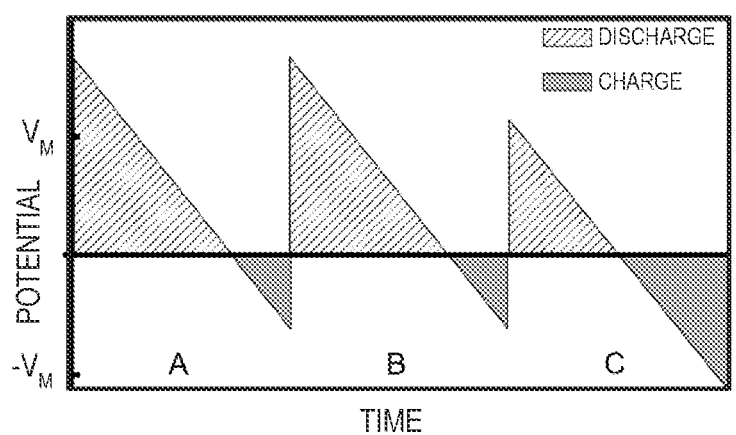
FIG. 8 shows a graph of cell potentials according to certain embodiments of the present invention.

FIG. 8 shows a graph of $V_{cell}$ versus time, for the three steps of the movement of ions shown in FIG. 6, in an energy generation/mixing mode. Steps A and B move ions through the membrane in the direction of the built-in electric field. The energy of discharge (diagonal fill area) is greater the energy of charge (shaded area) because the ions are moving toward a lower potential. The excess energy in the latter two steps is extracted through a resistive load. The energy released is $Q(V_M-IR)$. Step C "resets" the opening conditions, with ions located on the initial electrode 12.

For energy storage or deionization, the polarity of membrane potential $V_M$ is reversed and the ions move toward a higher potential. The graph shown in FIG. 8 is inverted about the axis and $Q(V_M+IR)$ must be added. For a fixed membrane area, the power/ion throughput is a function of the charge cycling rate.

Figure 9:
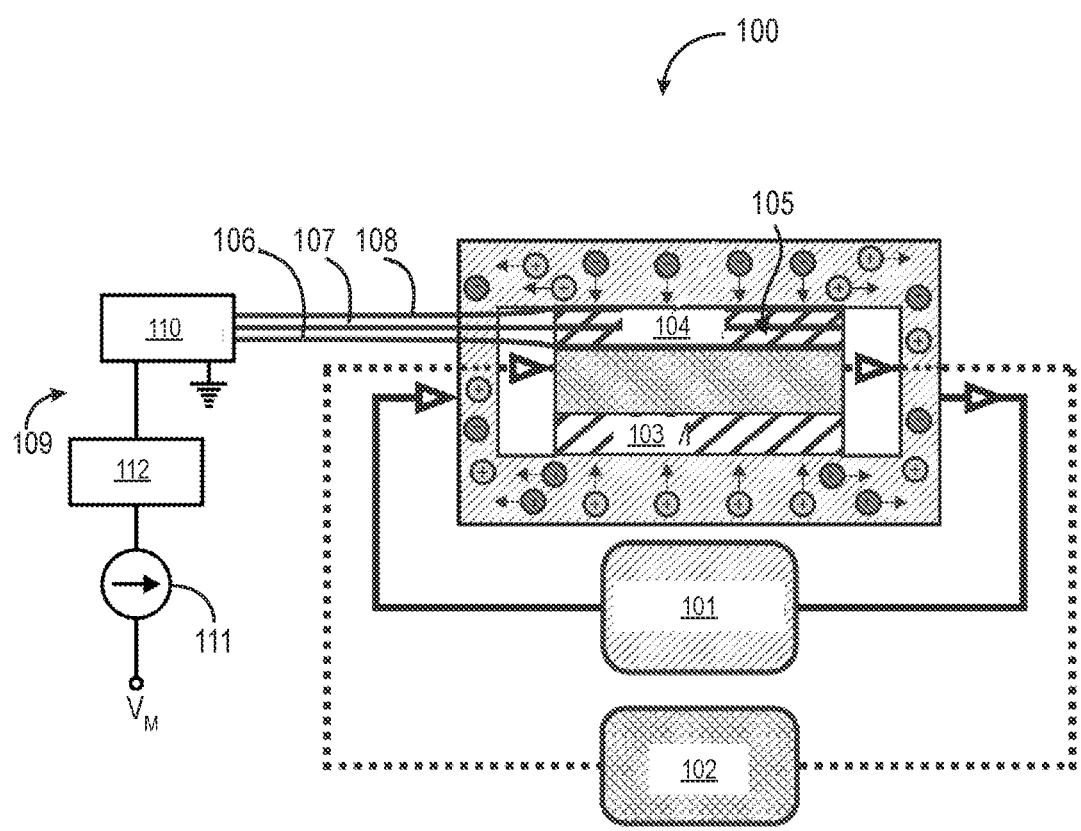
FIG. 9 shows a diagram of a gradient membrane electrode assembly cell according to certain embodiments of the present invention.

Referring now to FIG. 9, in one embodiment of the present invention, a device 100 for enabling controlled movement of ions between first ion-containing fluid 101 and a second ion-containing fluid 102 may comprise at least one cationic exchange membrane 103 positioned between the first and second ion-containing fluids 101, 102. The device 100 may further comprise at least one anionic exchange membrane 104 in parallel with the at least one cationic exchange membrane 103, and positioned between the first and second ion-containing fluids 101, 102. One or more of the at least one cationic exchange membrane 103 and the at least one anionic exchange membrane 104 is a membrane electrode assembly 105 comprising an ion exchange membrane and one or more permeable electrodes 106, 107, 108 embedded within the ionic exchange membrane. The device may further comprise a charger 109 connected to the at least one or more permeable electrodes 106, 107, 108, wherein the charger 109 supplies the one or more permeable electrodes 106, 107, 108 with a variable capacitive charge. The number of cationic exchange membranes 103 and the number of anionic exchange membranes 104 may be the same, and the ions may move through the membrane electrode assembly 105 in response to the variable capacitive charge.

The device 100 has a concentrated liquid 101 and a dilute liquid 102 flow path that are separated by a parallel arrangement of a cationic exchange membrane 103 and an anionic exchange membrane 104. The dilute liquid 102 flows across one surface of each membrane and the concentrated liquid 101 across the opposing surfaces. In FIG. 9, ions are shown moving in the spontaneous direction—i.e. from the concentrated to dilute liquid—and thus exemplifies the energy generation mode. The ion exchange membrane comprising the membrane electrode assembly 105 is depicted in FIG. 9 as an anionic exchange membrane 104, but may alternately be a cationic exchange membrane 103. The electrodes 106, 107, 108, are connected to a charger 109 depicted as a grounded switch 110 connected to a constant current source 111 and optional electric load 112.

The membrane electrode assembly 105 may be charged before the charge cycling begins. Electrode 106 may be connected to an external electrode (not pictured), resulting in negative ions diffusing from dilute liquid 102 to electrode 106. The external electrode may be, for example, the internal wall of the cell container, or if the cell contains both a cationic and anionic membrane electrode assembly, an electrode in the oppositely charged membrane electrode assembly. The external electrode may also be electrodes in the flow path of the concentrated or dilute liquids 101, 102 as described in other embodiments described herein. Once established, the internal membrane electrode assembly charge remains constant. Only the position of the charge among the electrodes 106, 107, 108 varies. Electrodes 107, 108 may then be raised to a high potential to block diffusion.

Mobile co-ions near the surfaces of electrodes 107, 108 are drawn onto the surface of electrode 106, leaving a membrane bound space charge near electrodes 107, 108. The quantity of charge transferred in these steps may be very small compared to the initial charging step.

Figure 10:
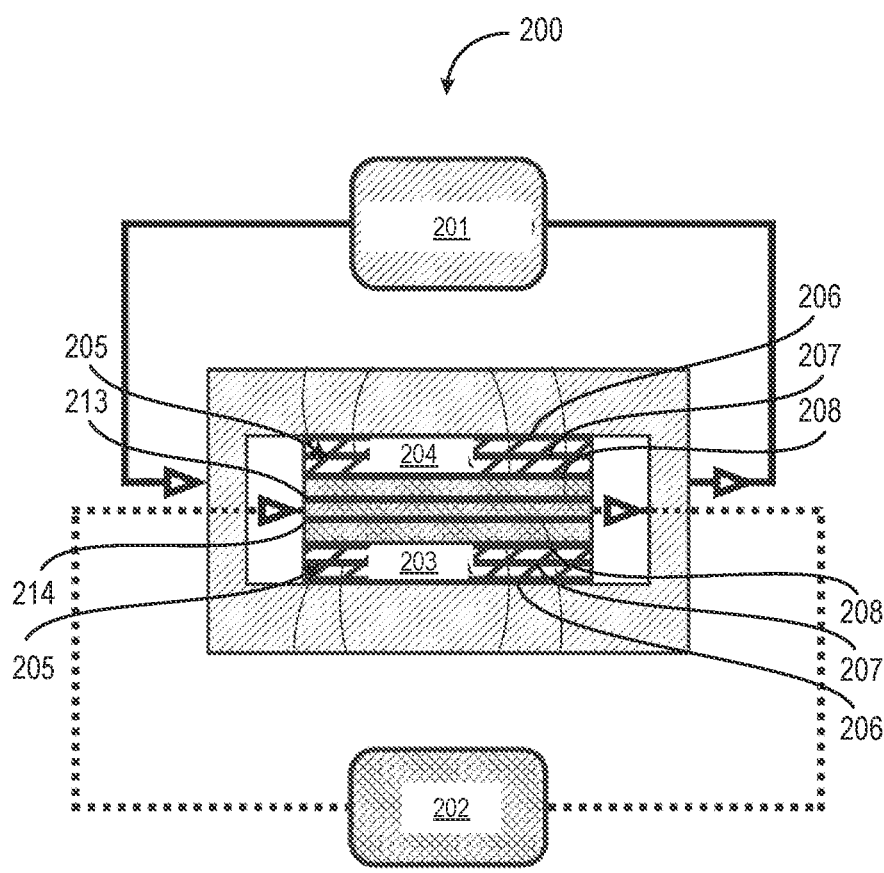
FIG. 10 shows a diagram of a gradient membrane electrode assembly cell according to certain embodiments of the present invention.

Referring now to FIG. 10, in one embodiment of the present invention, a device 200 for enabling controlled movement of ions between first ion-containing fluid 201 and a second ion-containing fluid 202 may comprise at least one cationic exchange membrane 203 positioned between the first and second ion-containing fluids 201, 202. The device 200 may further comprise at least one anionic exchange membrane 204 in parallel with the at least one cationic exchange membrane 203, and positioned between the first and second ion-containing fluids 201, 202. One or more of the at least one cationic exchange membrane 203 and the at least one anionic exchange membrane 204 is a membrane electrode assembly 205 comprising an ion exchange membrane and one or more permeable electrodes 206, 207, 208 embedded within the ionic exchange membrane. The device may further comprise a charger 209 connected to the at least one or more permeable electrodes 206, 207, 208, wherein the charger 209 supplies the one or more permeable electrodes 206, 207, 208 with a variable capacitive charge. The number of cationic exchange membranes 203 and the number of anionic exchange membranes 204 may be the same, and the ions may move through the membrane electrode assembly 205 in response to the variable capacitive charge.

In some embodiments, the device may further comprise permeable external electrodes 213, 214 in the dilute liquid 202 flow path.

Figure 11:
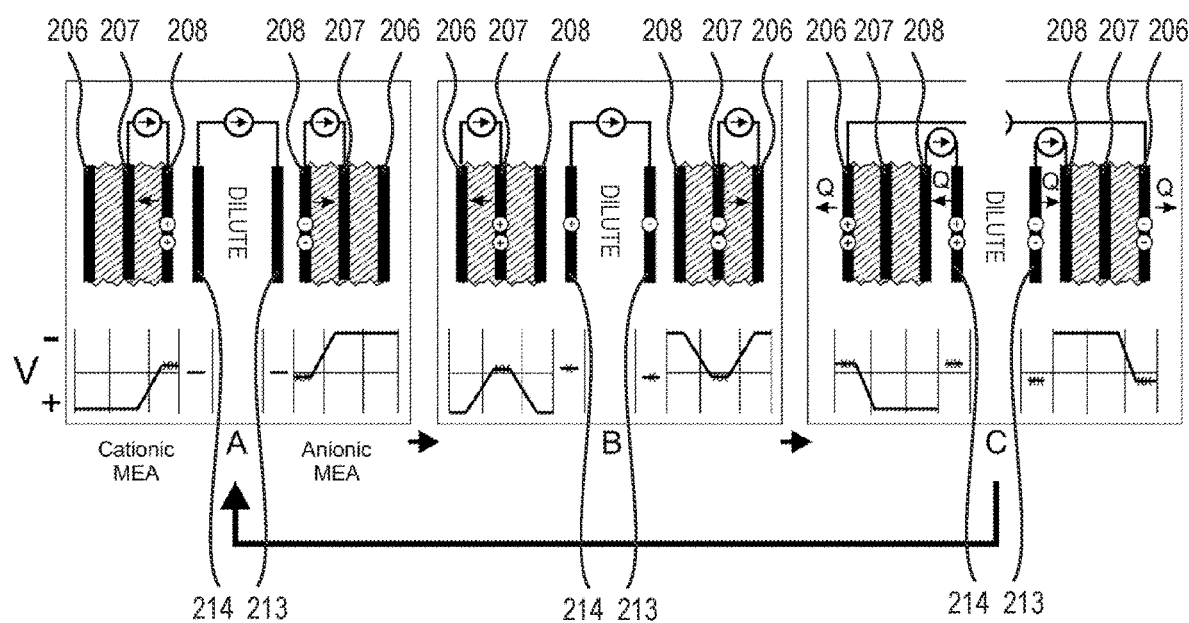
FIG. 11 shows a circuit schematic of an anionic and cationic membrane electrode assembly pair according to certain embodiments of the present invention.

Referring now to FIG. 11, a schematic view of the deionization/energy storage cycle in the embodiment depicted in FIG. 10 is shown. Charge position and relative electrode potentials are shown for each step. In steps A and B, ions are extracted from the dilute liquid 202 onto surface electrodes 213, 214 by application of a constant current as ions are concurrently moving through the membrane electrode assemblies 205. In step C, the accumulated surface ions on surface electrodes 213, 214 are transferred into the adjacent membrane electrode assemblies 205, while simultaneously exiting from the concentrated liquid 201.

This process results in both ion diffusion and enhanced drift (via the applied potential on the surface electrodes) working in tandem to drive ion conduction through the membranes 205. A higher effective ion concentration is maintained at the membrane 205 surfaces relative to the bulk dilute liquid 202, producing a proportional increase in the limiting current density. Another advantage is that co-ions are repelled from the surface by the charge on the electrodes 206, 207, 208, leading to improved ion selectivity.

Figure 12:
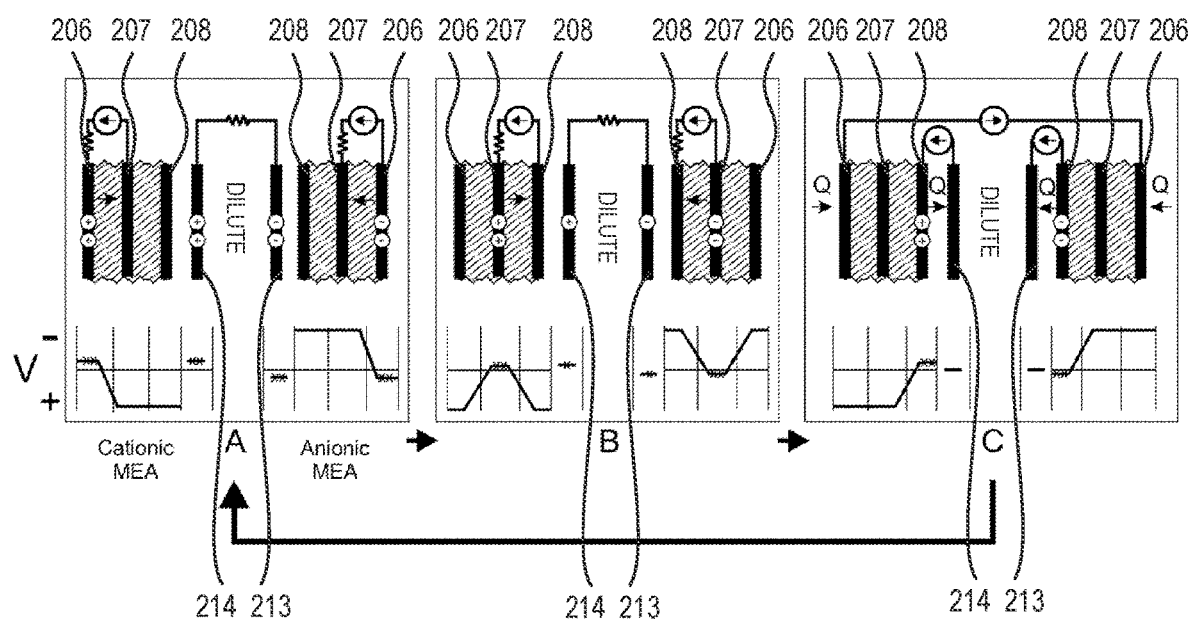
FIG. 12 shows a circuit schematic of an anionic and cationic membrane electrode assembly pair according to certain embodiments of the present invention.

Referring now to FIG. 12, a schematic view of the mixing/energy generation equivalent cycle in the embodiment depicted in FIG. 10 is shown. In steps A and B, ions are moving through the membrane electrode assemblies 205, while simultaneously ions are discharging from the surface electrodes 206, 207, 208. In step C ions are transferred from the membrane electrode assemblies 205 onto the surface electrodes 206, 207, 208, while simultaneously moving into the membrane electrode assemblies 205 from the concentrated liquid 201. As in the deionization process, the presence of a larger surface area and electric field during the discharge of the surface electrodes 206, 207, 208 reduces surface polarization, while repelling co-ions from the membrane 205 surface. In this instance, the enhanced dilute liquid 202 field is created by the ions as the surface electrodes 206, 207, 208 are discharging.

Figure 13:
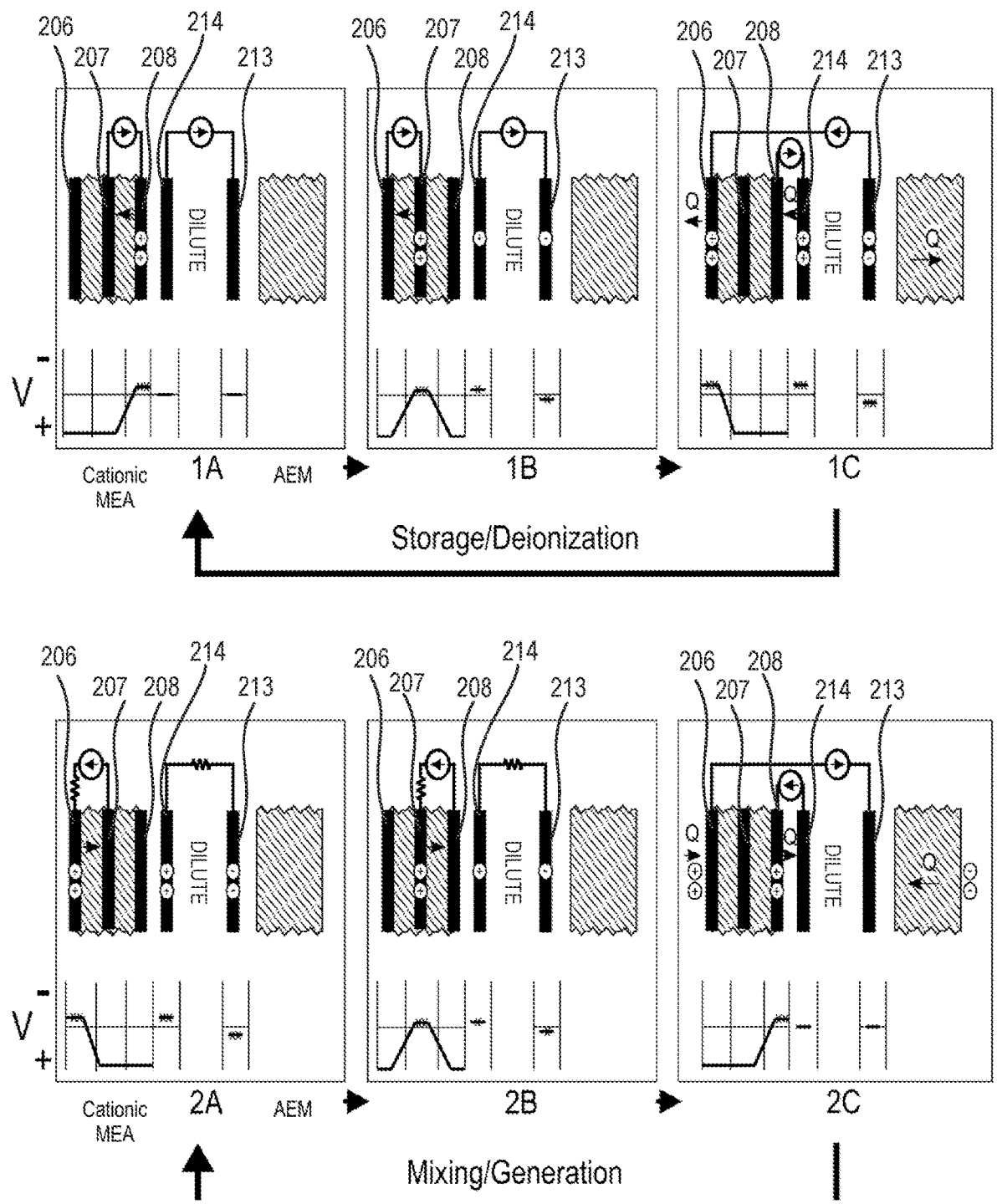
FIG. 13 shows a circuit schematic of a cationic membrane electrode assembly with external electrodes according to certain embodiments of the present invention.

Referring now to FIG. 13, in some embodiments, for deionization and desalination applications, it would be useful to place the external electrodes 213, 214 on both sides of the membrane electrode assemblies 205. This symmetrical five electrode arrangement allows for periodic flow reversal (analogous to electrodialysis reversal). Flow reversal is conventionally used to prevent membrane fouling.

In some embodiments, a membrane electrode assembly cell with external electrodes 213, 214 on both concentrate liquid 201 and dilute liquid 202 surfaces undergoes the same ⅔ cycle surface charge accumulation/release, ⅓ cycle surface charge transfer on both the dilute and concentrate liquid 202, 201 sides. The main benefit on the concentrate liquid 201 side is an improvement in ion selectivity and reduced polarization (leading to higher energy efficiency).

In some embodiments, the use of external electrode pairs can also be realized using a single membrane electrode assemblies.

Regardless of the particular arrangements, the same process applies to all membrane electrode assembly cells: ion exchange membranes block the passage of ions of one charge type, while the embedded electrodes control the passage of the co-ions via capacitive charging.

Figure 14:
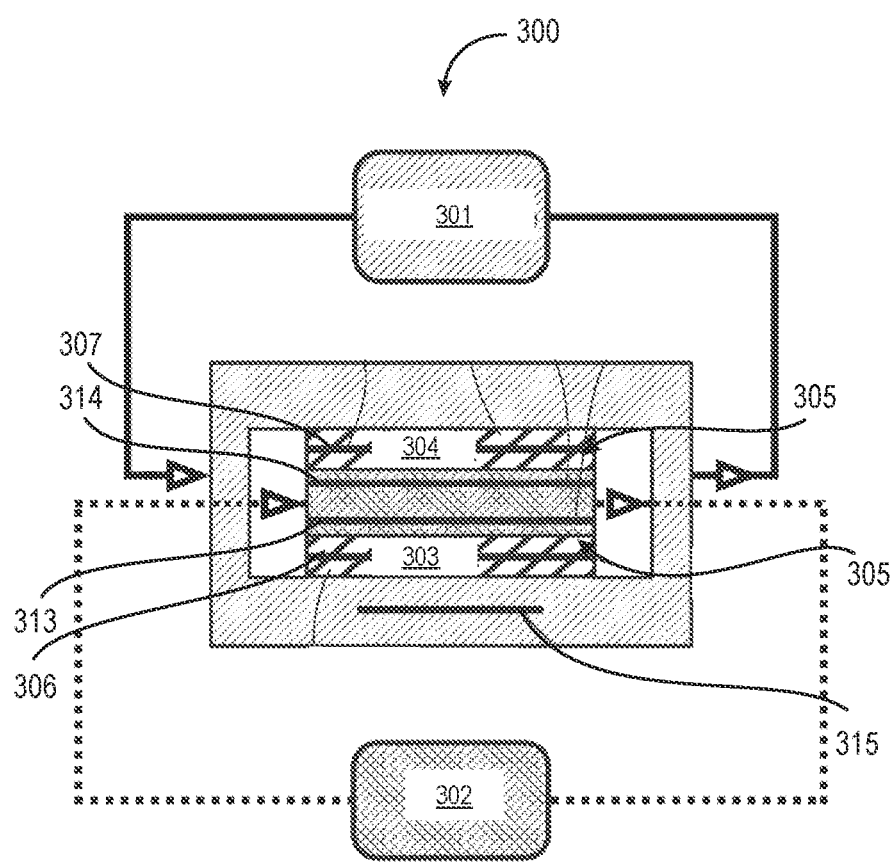
FIG. 14 shows a diagram of a gradient membrane electrode assembly cell according to certain embodiments of the present invention.
Figure 15:
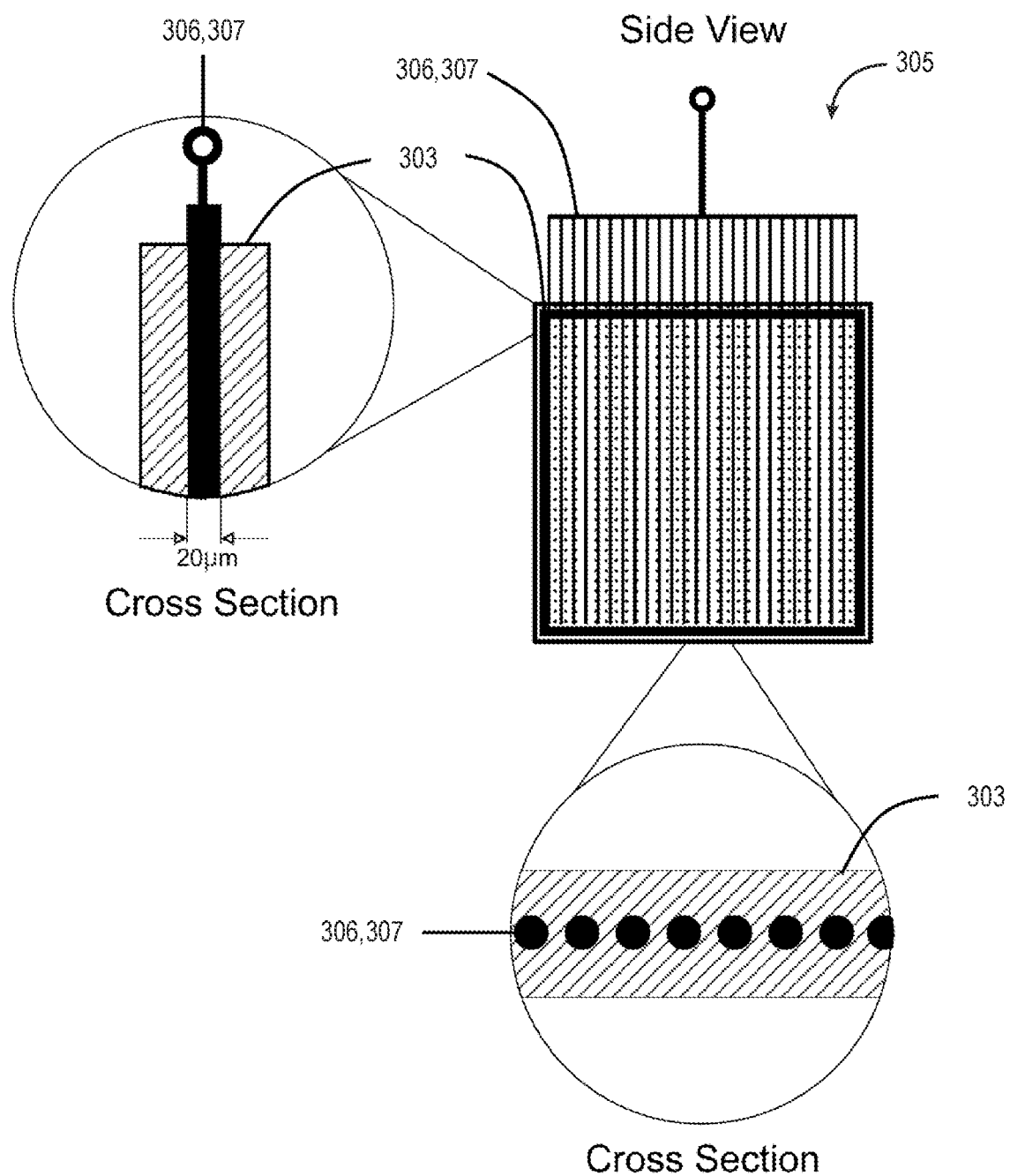
FIG. 15 shows a diagram of a membrane electrode assembly according to certain embodiments of the present invention.

Referring now to FIGS. 14 and 15, in one embodiment of the present invention, a "one electrode" membrane electrode assembly cell is shown. The device 300 for enabling controlled movement of ions between first ion-containing fluid 301 and a second ion-containing fluid 302 may comprise at least one cationic exchange membrane 303 positioned between the first and second ion-containing fluids 301, 302. The device 300 may further comprise at least one anionic exchange membrane 304 in parallel with the at least one cationic exchange membrane 303, and positioned between the first and second ion-containing fluids 301, 302. One or more of the at least one cationic exchange membrane 303 and the at least one anionic exchange membrane 304 is a membrane electrode assembly 305 comprising an ion exchange membrane and one or more permeable electrodes 306, 307 embedded within the ionic exchange membrane. The device may further comprise a charger 309 connected to the at least one or more permeable electrodes 306, 307 wherein the charger 309 supplies the one or more permeable electrodes 306, 307 with a variable capacitive charge. The number of cationic exchange membranes 303 and the number of anionic exchange membranes 304 may be the same, and the ions may move through the membrane electrode assembly 305 in response to the variable capacitive charge.

In some embodiments, the device may further comprise permeable external electrodes 313, 314 in the dilute liquid 302 flow path and permeable external electrodes 315 in the concentration liquid 301 flow path.

The dilute liquid 302 may flow across one surface of each membrane, while the concentrated liquid 301 may flow across the opposing surfaces. Both membranes 303, 304 in this cell may be constructed as a membrane electrode assembly 305. One electrode 306 may be embedded in the cationic permeable membrane 303 and another electrode 307 may be embedded in the anionic permeable membrane 304. A pair of electrodes 313, 314 may be located in the dilute liquid 302 flow path and another electrode 315 may be located in the concentrated liquid 302 flow path.

Figure 16:
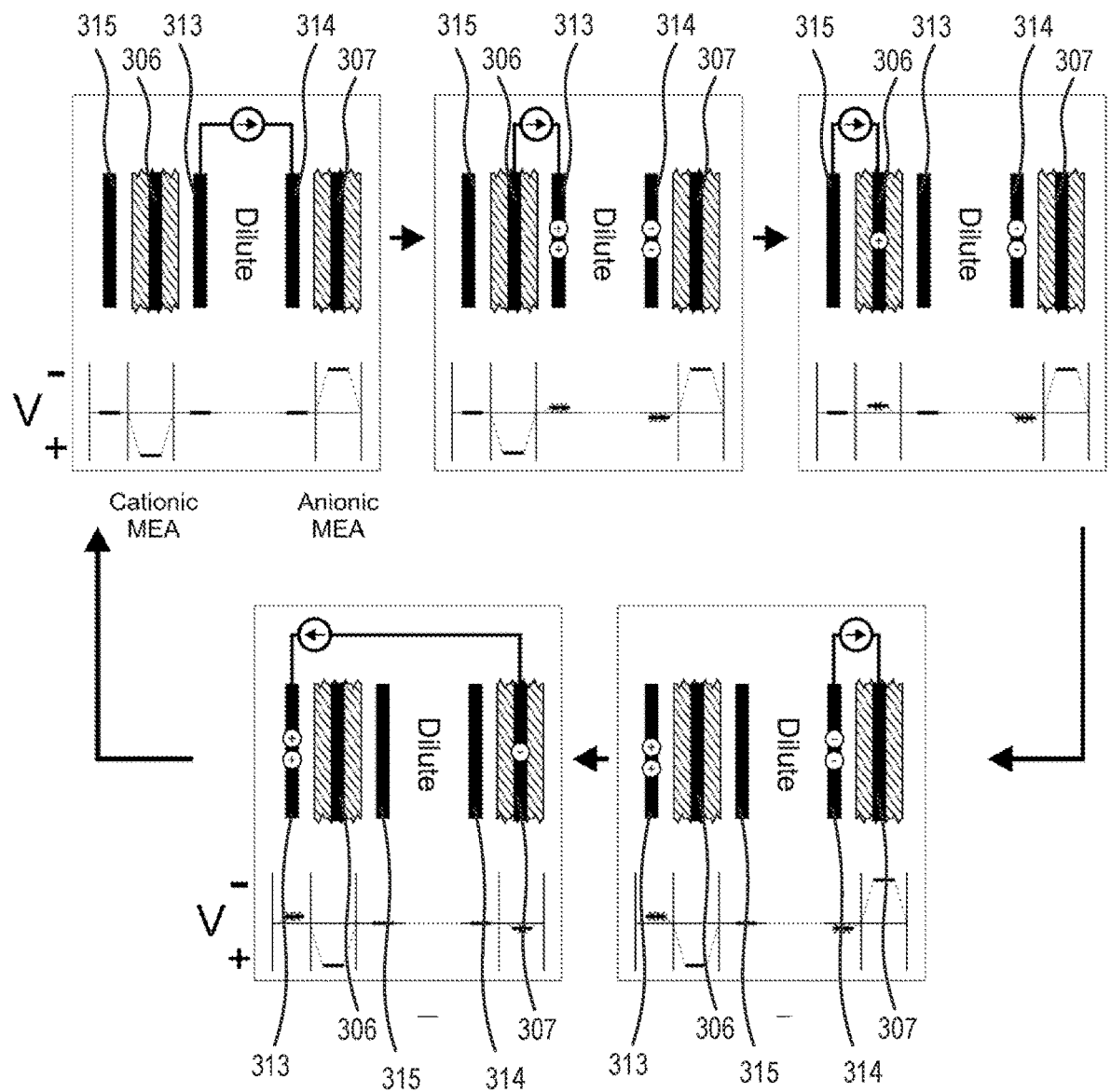
FIG. 16 shows a circuit schematic of an anionic and cationic membrane electrode assembly pair with external electrodes according to certain embodiments of the present invention.

Referring now to FIG. 16, a schematic view of the charge position and relative electrode potentials cycle in the embodiment depicted in FIG. 14 is shown. In step A, the external electrode pair 313, 314 are capacitively charged via a constant current source, extracting ions from the dilute liquid 302. Both embedded electrodes 306, 307 are in a blocking (high potential) state. In step B, the cations on electrode 313 are electrostatically transferred onto the electrode 306. In step C, the cationic charge on electrode 306 is transferred onto external electrode 315. When complete, electrode 306 reverts to a blocking state. In step D, the anions on electrode 314 are electrostatically transferred onto electrode 307. In step E, the anion charge on electrode 307 is transferred onto external electrode 315. When complete, electrode 307 reverts to a blocking state.

Figure 17:
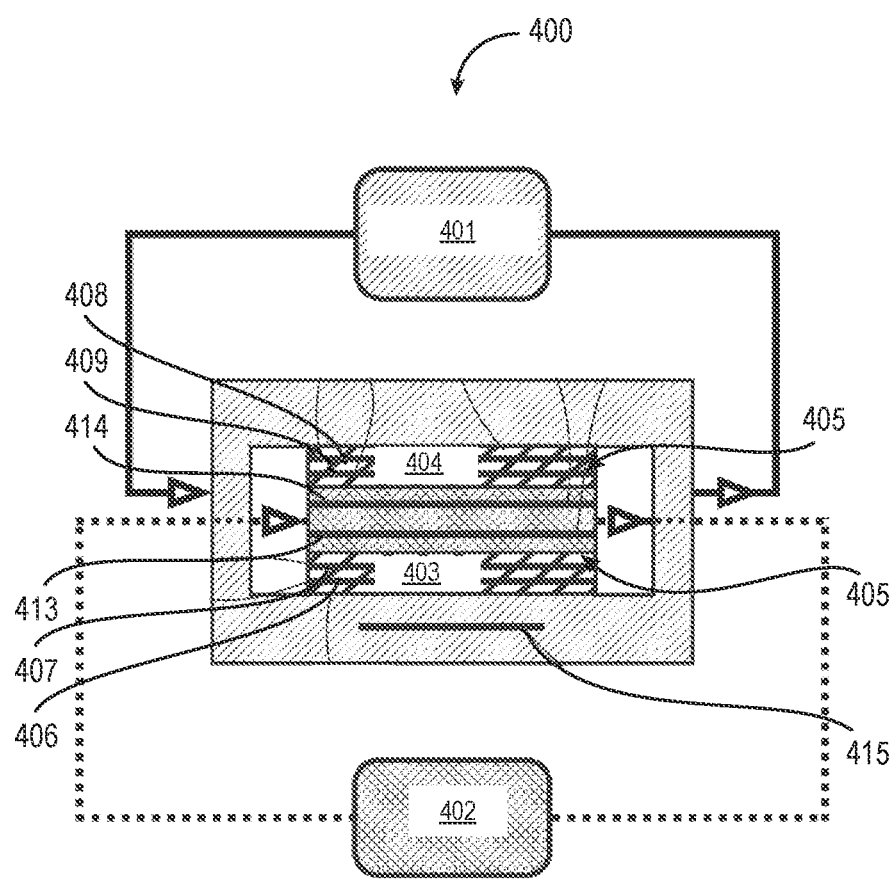
FIG. 17 shows a diagram of a gradient membrane electrode assembly cell according to certain embodiments of the present invention.
Figure 18:
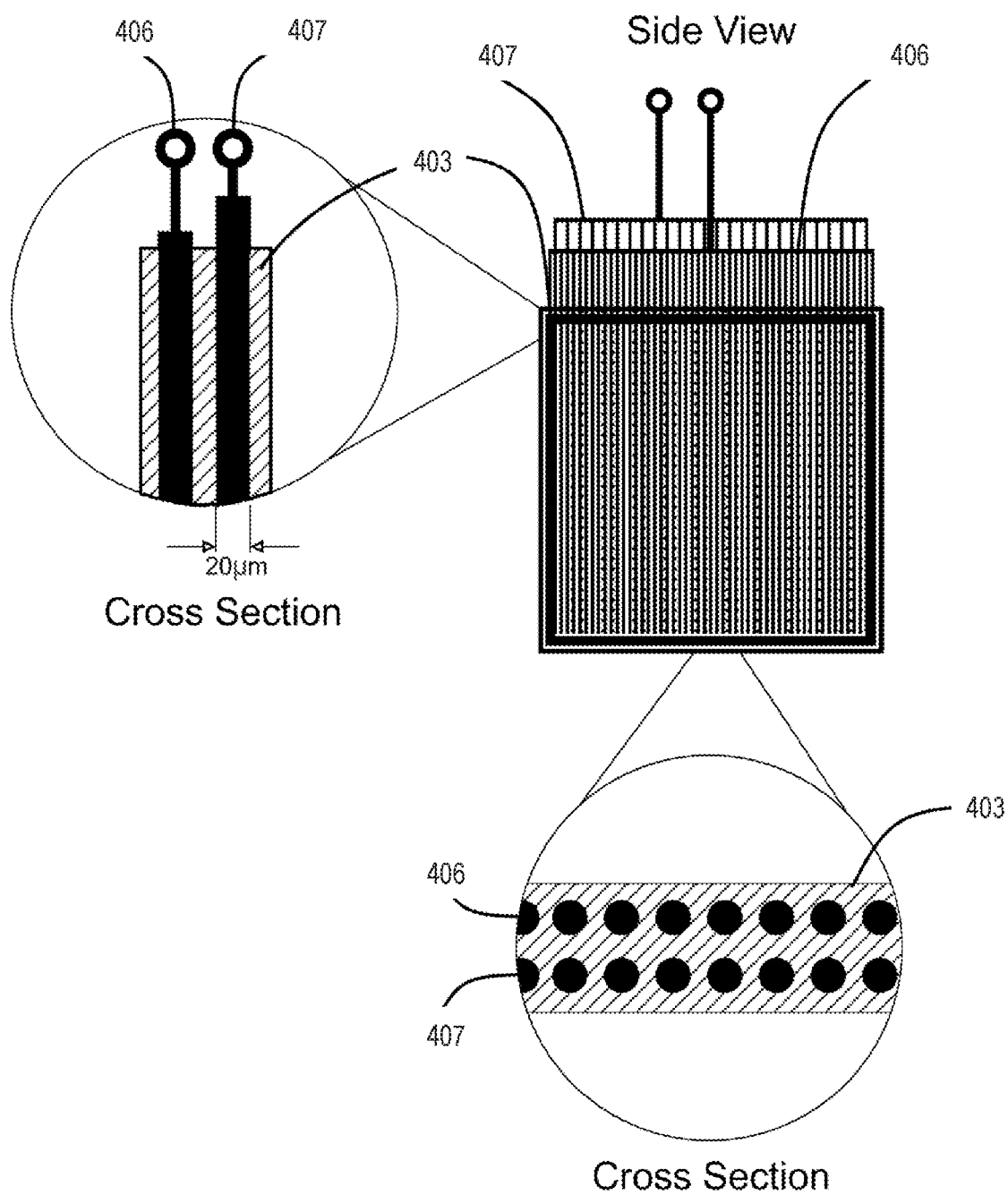
FIG. 18 shows a diagram of a membrane electrode assembly according to certain embodiments of the present invention.

Referring now to FIGS. 17 and 18, in one embodiment of the present invention, a "one electrode" membrane electrode assembly cell is shown. The device 400 for enabling controlled movement of ions between first ion-containing fluid 401 and a second ion-containing fluid 402 may comprise at least one cationic exchange membrane 403 positioned between the first and second ion-containing fluids 401, 402. The device 400 may further comprise at least one anionic exchange membrane 404 in parallel with the at least one cationic exchange membrane 403, and positioned between the first and second ion-containing fluids 401, 402. One or more of the at least one cationic exchange membrane 403 and the at least one anionic exchange membrane 404 is a membrane electrode assembly 405 comprising an ion exchange membrane and one or more permeable electrodes 406, 407, 408, 409 embedded within the ionic exchange membrane. The device may further comprise a charger 416 connected to the at least one or more permeable electrodes 406, 407, 408, 409 wherein the charger 416 supplies the one or more permeable electrodes 406, 407, 408, 409 with a variable capacitive charge. The number of cationic exchange membranes 403 and the number of anionic exchange membranes 404 may be the same, and the ions may move through the membrane electrode assembly 405 in response to the variable capacitive charge.

In some embodiments, the device may further comprise permeable external electrodes 413, 414 in the dilute liquid 402 flow path and permeable external electrodes 415 in the concentration liquid 401 flow path.

The dilute liquid 402 may flow across one surface of each membrane, while the concentrated liquid 401 may flow across the opposing surfaces. Both membranes 403, 404 in this cells may be constructed as membrane electrode assemblies 405. Two permeable electrodes 406, 407 may be embedded in the cationic exchange membrane 403 and another pair of permeable electrodes 408, 409 may be embedded in the anionic exchange membrane 404. A pair of electrodes 413, 414 may be located in the dilute liquid 402 flow path and another electrode 415 may be located in the concentrated liquid 402 flow path.

Figure 19:
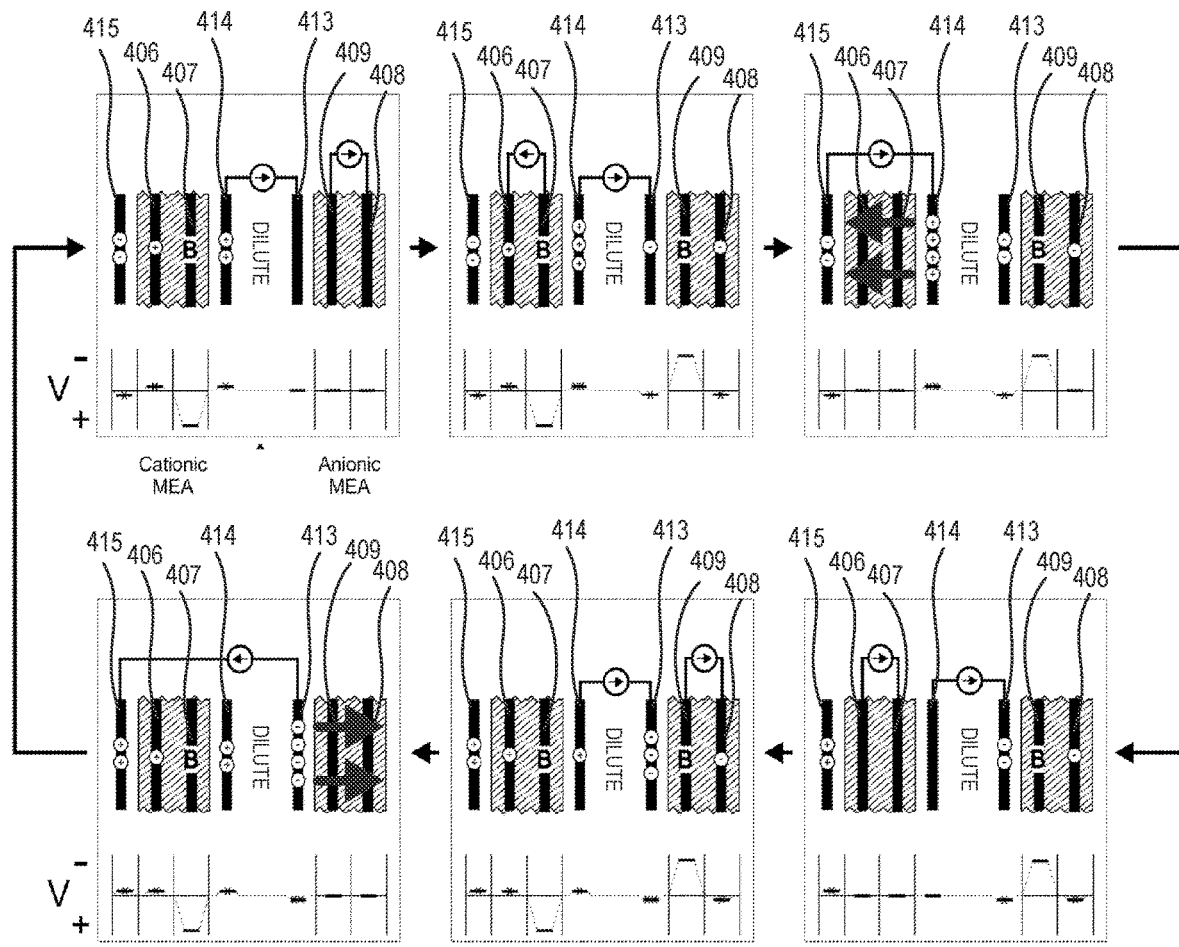
FIG. 19 shows a circuit schematic of an anionic and cationic membrane electrode assembly pair with external electrodes according to certain embodiments of the present invention.
Figure 11:
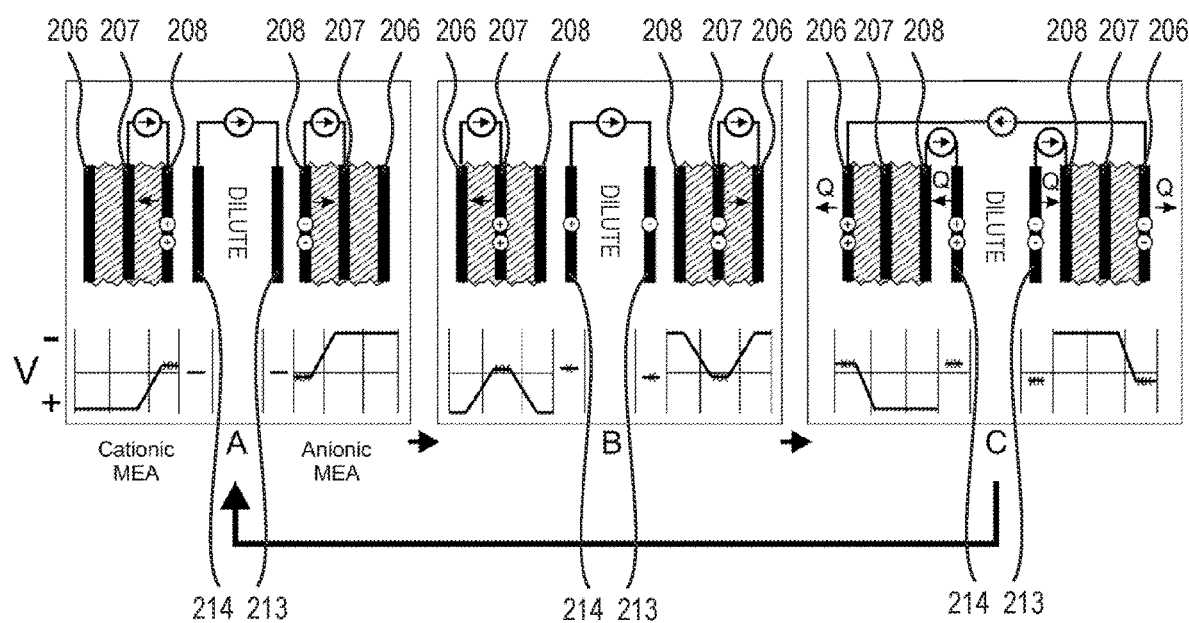

Referring now to FIG. 19, a schematic view of the charge position and relative electrode potentials cycle in the embodiment depicted in FIG. 17 is shown. In step A, electrode 407 embedded in the cationic membrane electrode assembly is initially in a blocking (high potential) state, indicated by a "B" symbol, while electrodes 408, 409 embedded in the anionic membrane electrode assembly are initially in a neutral, non-blocking state. The external electrode pair 413, 414 are capacitively charged via a constant current source, extracting ions from the dilute liquid 402. Simultaneously, electrodes 408, 409 are charged, switching the anionic electrode membrane assembly to a blocking state. In step B, the external electrode pair 413, 414 continue to charge, while electrodes 406, 407 embedded in the cationic membrane electrode assembly are discharged, switching the cationic membrane electrode assembly to a neutral, non-blocking state. In step C, the cationic charge on electrode 414 is transferred through the cationic membrane electrode assembly onto the external electrode 415 in the concentrated liquid 401. In step D, the external electrode pair 413, 414 are capacitively charged via a constant current source. Simultaneously, electrodes 406, 407 embedded in the cationic membrane electrode assembly are charged, switching the cationic membrane electrode assembly to a blocking state. In step E, external electrode pair 413, 414 continue to charge. Electrodes 408, 409 embedded in the anionic membrane electrode assembly are discharged, switching the anionic membrane electrode assembly to a neutral state. In step F, the anionic charge on external electrode 413 in the dilute liquid 402 is transferred through the anionic membrane electrode assembly onto the external electrode 418 in the concentrate liquid 401.

The quantity of charge on the membrane electrode assembly electrodes 406, 407, 408, 409 is independent of that on the external electrodes 413, 414, 415. The membrane electrode assembly electrodes 406, 407, 408, 409 in this instance solely act as an on/off switch for mobile co-ion transport. This is in contrast to the other described gradient membrane electrode assembly cells, where the membrane electrode assembly electrodes actively transport ionic charge on their surfaces. This may be advantageous in some circumstances.

The steps described above may be operated in reverse in a mixing/generation cycle.

Referring now to FIG. 20, in one embodiment of the present invention, a device 500 for enabling controlled movement of ions between a first ion-containing fluid 501 and a second ion-containing fluid 502 may comprise one or more membrane pairs arranged in series, each membrane pair comprising: a cationic exchange membrane 503 positioned between the first and second ion-containing fluids 501, 502, and an anionic exchange membrane 504 adjacent the cationic exchange membrane 503, and positioned between the first and second ion-containing fluids 501, 502. One of the cationic exchange membranes 503 and anionic exchange membranes 504 may be a membrane electrode assembly 505. The membrane electrode assembly 505 may comprise an ion exchange membrane and one or more permeable electrodes 506, 507, 508 embedded within the ionic exchange membrane. The device may further comprise a charger 509 connected to the at least one or more permeable electrodes 506, 507, 508, wherein the charger 509 supplies the one or more permeable electrodes 506, 507, 508 with a variable capacitive charge. The ions may move through the membrane electrode assembly 505 in response to the variable capacitive charge.

The membrane pairs are stacked in series, an arrangement typically found in electrodialysis cells. Alternating cation and anion exchange membranes lay between alternating concentrated and dilute liquid 501, 502 flow paths. There are two membrane stacks that are electrically isolated except at their ends, where they are ionically "short-circuited" by the concentrated liquid 501. At least one of the membranes in the stack is constructed as either a cationic exchange membrane 503 or an anionic exchange membrane 504.

The maximum membrane electrode assembly current density can be calculated from an estimated ion mobility and an average inter-electrode distance. Using a mobility of 5 $m^2V^{-1}s^{-1}$ and 21 μm separation, at $2V_{peak}$ the maximum charging frequency is 1130 Hz. Using a frequency of 1 kHz with smooth surface wires of 20 μm diameter and 1 um separation, a current density of 1.6 mA/cm$^2$ is found. Aluminum electrodes found in capacitors are etched to increase surface area, typically by 80 to 100×. With surface etching, the maximum current density can be increased to 160 mA/cm². At this current capacity the membrane electrode assembly would not be a limiting factor with respect to ion throughput.

An important factor in ion transport through membranes is the "limiting current density". As membranes are a significant cost component of a gradient cell, a higher current density reduces capital costs by allowing the use of a smaller membrane area. The current density is limited by "membrane polarization", which is an artefact of diffusion limitations. At a certain current level, the ion diffusion layer near the membrane surface becomes the limiting step in deionization, as opposed to ion transport through the membrane. Upon reaching the limiting current, the concentration of cations on a cationic exchange membrane surface or anions on an anionic exchange membrane becomes zero and electrical resistance increases sharply.

Similarly, in an energy generation mode where ionic current is from concentrate to dilute phase, ions will tend to accumulate at the dilute membrane surfaces when current density increases above a certain limit. Above this limit, cell voltage and energy recovery are greatly reduced.

The pulsed charge movement of a membrane electrode assembly may be utilized to further lower capital costs by increasing the limiting current and proportionally reducing membrane area. To accomplish this, a non-embedded electrode pair is positioned within the dilute flow channel. The external pair adds an ion migration component to diluate conduction that is highly configurable with respect to intensity and timing. They are preferably constructed as a sintered, ultra-fine wire mesh. The pair additionally function as non-shadowing membrane spacers. In this form, they provide a large, electrically-active area, positioned within the dilute flow channel.

The external pair do not undergo a polarity switch, but instead charge (deionization)/discharge (generation) ions during the 2/3 cycle that ions are moving through the membrane electrode assemblies. During the remaining 1/3 cycle, they transfer this charge to/from the membrane electrode assemblies.

The electrodes in a gradient membrane electrode assembly transform ion exchange membranes from passive charge filters to active electronic devices. This introduces new avenues for the improvement of critical membrane parameters, such as selectivity and conductivity. For instance, given that the bulk of the mobile charge is found on the membrane electrode assembly electrode surfaces in operation (with the exception of the cycle of FIG. 19), it is expected that a higher concentration of fixed charge near the electrode surfaces will improve selectivity, as well as possibly improve conductivity. This may be accomplished in the manufacturing process by first coating the electrodes with a prepolymer of high charge density, followed by impregnation and curing of the bulk ion exchange polymer.

Applications

There are numerous existing applications for electrodialysis and membrane capacitive ionization, as well as the many variants of the two parent devices. Some representative examples are given below.

Energy Storage

A concentration gradient is an attractive system for energy storage. Where a large, reversible difference in ion activity can be established, gradients combine low system cost with high energy density. A gradient system has the same advantages that other "flow storage" devices, such as flow batteries and fuel cells, have over conventional batteries. Foremost is that power output and storage capacity are independent. Capacity can be scaled by changing the size of the liquid reservoirs, with minimal impact on system cost. Whereas power is a function of electrode area. Unlike flow batteries and fuel cells, a gradient system does not rely on electrochemical reactions and so does not share the high cost, poor efficiency and short lifespan of those devices.

Dilute and Concentrate Phases

With regard to the dilute phase, an ion exchange resin is the preferred means of creating a low ion activity. The resin may be in the form of a small particle, liquid suspension. These resins remove ions via an acid-base reaction that yields uncharged products (Ref. 5), typically water. They also increase the ion conductivity of the liquid they are suspended in, due to their high internal ion activity (Ref. 6). To maintain reversibility of the deionization reaction, a strong acid should be combined with a weak base or a strong base with a weak acid. Examples of this are given below.

For the concentrate phase, ionic liquids such as 1,3-dialkylimidazolium hydroxide and ethylammonium nitrate (Ref. 7) are preferred. Ionic liquids have several advantages including high ionic conductivities and high gravimetric and volumetric ion densities. And because they are nearly pure in use, they exhibit constant ion activity close to unity.

Ionic liquids are available in both basic and acidic forms (Ref. 8, 9). The acidity or basicity of the ion exchange resin may be appropriately matched to that of the ionic liquid to maintain reversibility. 1,3-dialkylimidazolium hydroxides are strongly basic and should be paired with a weak acid, such as crosslinked polyacrylic acid in water. The ethylammonium nitrate is weakly acidic and should be paired with a strong base to be adequately deprotonated. An anion exchange resin containing bound quaternary amine, such as Dowex© Marathon A, with an alkoxide anion is a suitable combination. The resin may be suspended in a nonacidic or very weakly acidic polar liquid, such an alcohol.

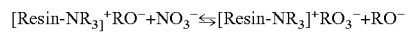

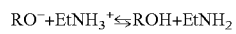

The deionization process consists of an initial exchange of nitrate with the resin alkoxide. The liquid phase alkoxide abstracts a proton from ethylammonium to form ethylamine and a neutral alcohol. All reactants and products are in equilibrium with each other.

Other suitable concentrates include solutions of either a strong acid (e.g. hydrochloric and sulfuric acid) or strong base (e.g. lithium and sodium hydroxide). In order to maintain reversibility of the deionization reaction, strong acid must be paired with a weakly basic anion exchange resin (such as crosslinked polyethylenimine in water). Similarly, a strong base should be combined with a weakly acidic cation exchanger (e.g. Amberlite© IC-50 in water).

Ionic liquids in combination with deionization resins can attain storage densities as high as 0.5 MJ/kg (theoretical). By comparison, lithium ion batteries have storage densities up to 0.8 MJ/kg and commercially available vanadium flow batteries have a storage density of about 0.15 MJ/kg.

Temperature Effects

Temperature is an important parameter which may be used advantageously for energy storage in gradient cells. Cell output potential is found from the Nernst equation (Eq. 4), $$V = \frac{RT}{zF} \ln \frac{a1}{a2}. \qquad \text{Eq. 4}$$

At a fixed activity ratio, potential is proportional to absolute temperature, T. Gradient cells are therefore a type of heat engine and the electrical energy they store is a consequence of the entropy change that occurs when ions move through the gradient. An increase in the temperature of the cell will proportionally increase both the change in entropy and the stored energy.

Cell discharge (gradient mixing) is an endothermic process, absorbing heat from the surroundings, while charging (deionization) is exothermic. Therefore a gradient cell, when used for energy storage, requires a heat sink to maintain a constant temperature. For every unit of electric energy produced or stored, an equal quantity of heat is exchanged into the heat sink.

The charging and discharging steps are similar to an isothermal gas compression and decompression. By comparison, the compression ratio of a diesel engine can be up to 50. The concentration ratio in a reversible gradient cell can reach $10^5$. This very high ratio is the primary reason for the high energy density of a gradient system.

This temperature dependence can be used to improve storage efficiency and capacity. For example, utility companies store excess generating capacity at night for later use during the day when demand is higher, a technique known as load leveling. In general, ambient temperature will be lower at night. Less energy is required to charge at night and more energy is released during the warmer daytime temperatures. An increase in temperature from 0 to 14° C. (273 to 288K) will increase the cell open circuit potential and the energy produced by 5%, relative to an isothermal process. Actively heating the cell with solar or industrial waste heat has the potential to increase energy output further. A 100° C. rise in cell temperature will increase its potential by 36%.

A simple and efficient method for the creation and discharge of a concentration gradient would provide for a low cost and versatile means of storing electricity, on a moderate to very large scale. No commercially viable technique has yet been developed for the storage of energy in a gradient system (Ref. 11, 12, 13). A membrane electrode assembly device combines both simplicity with efficiency, making it exceptionally well suited for such an application.

Energy Generation

Gradient mixing occurs on a massive scale where rivers enter the ocean, sometime referred to as "blue energy". The energy that could be obtained from this mixing worldwide is about 984 GW/s. This energy source is not yet being harnessed on a scale larger than pilot tests, due to the costs and inefficiency of existing gradient devices. A gradient membrane electrode assembly cell has both improved efficiency and reduced complexity compared to existing ED and CI cells. These advantages make gradient membrane electrode assembly cells very well suited for blue energy applications.

Deionization/Desalination

The advantages of using a membrane electrode assembly for deionization in comparison to existing devices are improved energy efficiency and reduced system complexity/cost. Like other electrically driven methods, a membrane electrode assembly device has properties that are complimentary to pressure-driven reverse osmosis.

Electrodialysis is the most common electrically driven deionization method. Two factors that most effect electrodialysis efficiency are the high electric field and the oxidation-reduction couple needed to complete the ionic circuit. The oxidation-reduction couple is a major disadvantage for these systems. It reduces efficiency through both electrode resistance and the large overpotentials associated with oxidation/reduction reactions. The electrodes are also a significant cost component, as they must be made or coated with metals that catalyze these reactions. The needed high field strength reduces efficiency by moving ions through a potential greater than thermodynamic minimum. High field strengths also lead to degradation of the membranes.

The other commercial electro-deionization technique, capacitive ionization, has efficiency drawbacks that have prevented it from becoming a common device. Two major factors that reduce efficiency are the high electrodes capacitance and the need for fluid switching. High capacitance electrodes require ions to travel through a network of narrow pores to reach the entire electrode surface. This results in increased internal resistance and slow switching times, particularly in liquids with low ionic strengths. The need for flow switching increases system complexity, reduces power input and partially mixes the dilute/concentrate fluids.

For a membrane electrode assembly device, none of the above concerns exist. The applied potential within the membrane electrode assembly can be equal to the thermodynamic minimum ($V_T$+IR). As with capacitive ionization, there are no electrochemical reactions involved, so there are none of the losses or costs associated with redox electrodes. Unlike capacitive ionization, there are no flow switching requirements. And high capacitance electrodes are neither needed nor preferred, as maxim power favors low surface area electrodes combined with high frequency charge cycling. The maximum power/ion throughput for a given membrane electrode assembly area is limited only by its through-plane conductivity.

Those skilled in the art will recognize improvements and modifications to the embodiments of the present disclosure. All such improvements and modifications are considered within the scope of the concepts disclosed herein and the claims that follow.

What is claimed is:

1. A device for enabling controlled movement of ions between a first ion-containing fluid and a second ion-containing fluid comprising:
    at least one cationic exchange membrane positioned between the first and second ion-containing fluids;
    at least one anionic exchange membrane in parallel with the at least one cationic exchange membrane, and positioned between the first and second ion-containing fluids;
    wherein at least a portion of at least one of the first and second ion-containing fluids defines an ionic conduction path between the cationic exchange membrane and the anionic exchange membrane;
    wherein one or more of the at least one cationic exchange membrane and the at least one anionic exchange membrane is a membrane electrode assembly comprising:
        an ion exchange membrane; and
        one or more permeable electrodes embedded within the ionic exchange membrane, wherein the one or more permeable electrodes is filled with an ion exchange membrane material, forming an ionically conductive path that allows either positive or negative co-ions to move freely through the membrane electrode assembly;
    a charger connected to the at least one or more permeable electrodes, wherein the charger supplies the one or more permeable electrodes with a variable capacitive charge;
    wherein the number of cationic exchange membranes and the number of anionic exchange membranes is the same; and wherein ions move through the membrane electrode assembly in response to the variable capacitive charge.

2. The device of claim 1, further comprising a grounded switch connected to the charger and the one or more permeable electrodes.

3. The device of claim 1, wherein an ion concentration of the first ion-containing fluid is greater than an ion concentration of the second ion-containing fluid.

4. The device of claim 1, wherein the ion exchange membrane of the membrane electrode assembly is a cationic exchange membrane.

5. The device of claim 1, wherein the ion exchange membrane of the membrane electrode assembly is an anionic exchange membrane.

6. The device of claim 1, further comprising at least one external permeable electrodes in the second ion-containing fluid.

7. The device of claim 6, further comprising at least one external permeable electrode in the first ion-containing fluid.

8. The device of claim 6, wherein a charge from the at least one external permeable electrode in the second ion-containing fluid is transferred to the membrane electrode assembly.

9. The device of claim 7, wherein a charge from the at least one external permeable electrode in the first ion-containing fluid is transferred to the membrane electrode assembly.

10. A device for enabling controlled movement of ions between a first ion-containing fluid and a second ion-containing fluid comprising:
    one or more membrane pairs arranged in series, each membrane pair comprising:
        a cationic exchange membrane positioned between the first and second ion-containing fluids;
        an anionic exchange membrane adjacent the cationic exchange membrane, and positioned between the first and second ion-containing fluids;
        wherein at least a portion of at least one of the first and second ion-containing fluids defines an ionic conduction path between the cationic exchange membrane and the anionic exchange membrane;
    wherein one of the cationic exchange membranes and anionic exchange membranes is a membrane electrode assembly comprising:
        an ion exchange membrane; and
        one or more permeable electrodes embedded within the ion exchange membrane,
        wherein the one or more permeable electrodes is filled with an ion exchange membrane material, forming an ionically conductive path that allows either positive or negative co-ions to move freely through the membrane electrode assembly;
    a charger connected to the at least one or more permeable electrodes, wherein the charger supplies the one or more permeable electrodes with a variable capacitive charge;
    wherein ions move through the membrane electrode assembly in response to the variable capacitive charge.

11. The device of claim 10, further comprising a grounded switch connected to the charger and the one or more permeable electrodes.

12. The device of claim 10, wherein an ion concentration of the first ion-containing fluid is greater than an ion concentration of the second ion-containing fluid.

13. The device of claim 10, wherein the ion exchange membrane of the membrane electrode assembly is a cationic exchange membrane.

14. The device of claim 10, wherein the ion exchange membrane of the membrane electrode assembly is an anionic exchange membrane.

15. The device of claim 10, further comprising at least one external permeable electrodes in the second ion-containing fluid.

16. The device of claim 15, further comprising at least one external permeable electrode in the first ion-containing fluid.

17. The device of claim 15, wherein a charge from the at least one external permeable electrode in the second ion-containing fluid is transferred to the membrane electrode assembly.

18. The device of claim 16, wherein a charge from the at least one external permeable electrode in the first ion-containing fluid is transferred to the membrane electrode assembly.

* * * * *